(No Model.)
G. L. JONES.
CHUCK.
No. 366,485. Patented July 12, 1887.
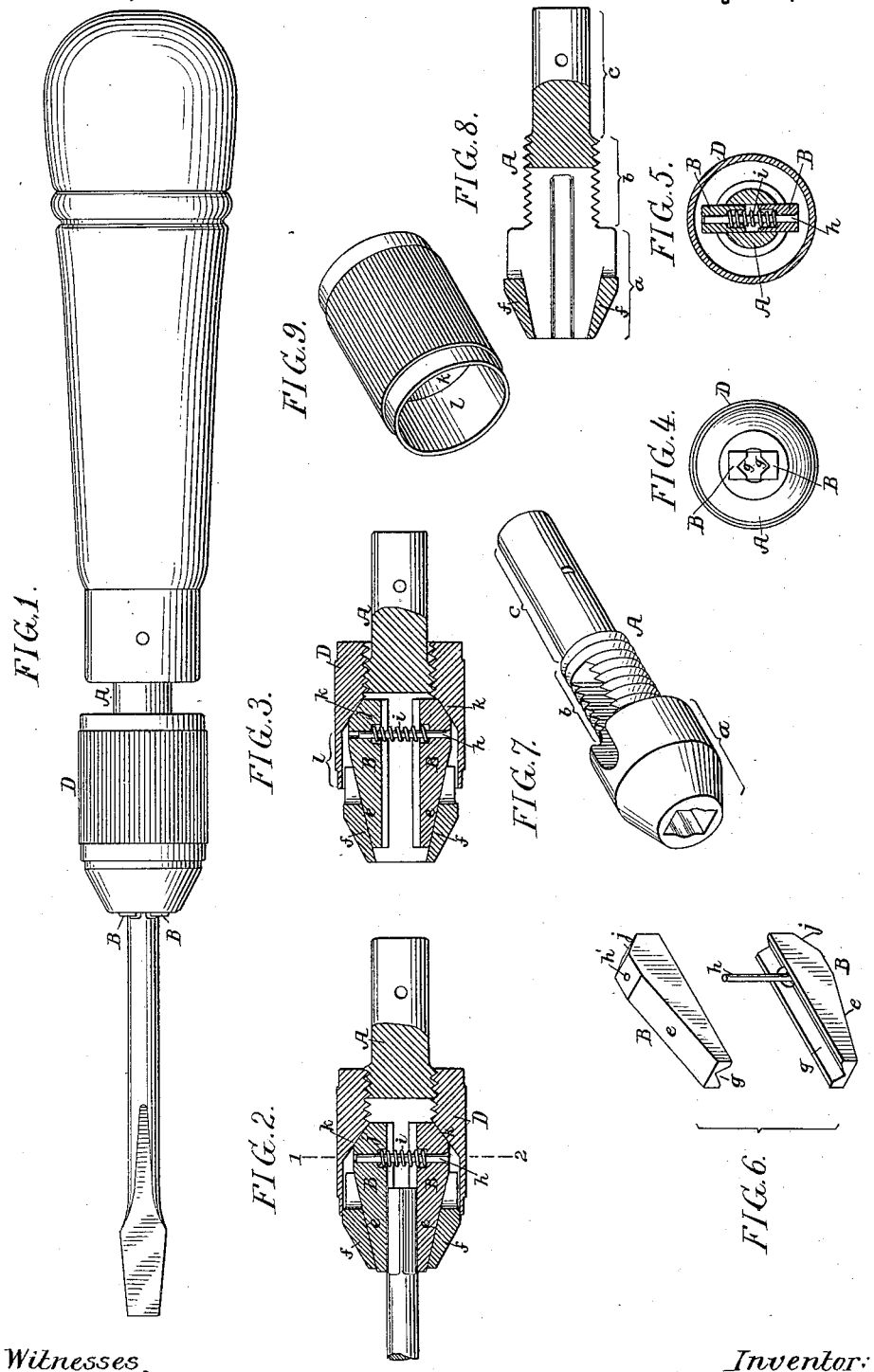
Witnesses
William P. Conner.
Aley. Barkoff
Inventor:
Griffith L. Jones
by his Attorneys
Howson & Son

United States Patent Office.

GRIFFITH L. JONES, OF READING, PENNSYLVANIA, ASSIGNOR TO THE READING HARDWARE COMPANY, OF SAME PLACE.

CHUCK.

SPECIFICATION forming part of Letters Patent No. 366,485, dated July 12, 1887.

Application filed November 26, 1886. Serial No. 219,909. (No model.)

*To all whom it may concern:*

Be it known that I, GRIFFITH L. JONES, a citizen of the United States, residing in Reading, Berks county, Pennsylvania, have invented certain Improvements in Chucks, of which the following is a specification.

The object of my invention is to construct a parallel-motion gripping-chuck having but few parts and simple in construction, so as to insure economy in its manufacture.

In the accompanying drawings, Figure 1 is a side view of my improved chuck provided with a handle. Fig. 2 is a sectional view of the chuck, showing the jaws closed upon the tool. Fig. 3 is a sectional view showing the jaws open. Fig. 4 is an end view of Fig. 2. Fig. 5 is a section on the line 1 2, Fig. 2. Fig. 6 is a view showing the gripping-jaws detached from the chuck. Figs. 7 and 8 are views of the shell detached, and Fig. 9 is a perspective view of the sleeve-nut.

A is the shell, made in the peculiar form shown in Fig. 7, having a head, $a$, a screw-threaded portion, $b$, and a reduced shank, $c$, which is adapted to fit either into a handle or into the spindle of a drill, lathe, or brace, as the case may be. This shell is cored out in casting, as shown in Figs. 7 and 8, for the reception of the jaws B B, which are of the form shown in Fig. 6, each jaw having a tapered portion, $e\ e$, of the same inclination as a tapered portion, $f$, of the cored-out portion, $d$, of the shell A, Fig. 8. These jaws have the usual gripping-surfaces, $g\ g$, and one of the jaws is provided with a guide-pin, $h$, which moves freely in an orifice, $h'$, in the other jaw. This pin acts as a guide for the jaws, causing them to retain the same relative position to each other as they are forced outward into the holder or shell A by a spring, $i$, which tends to keep the jaws apart, the ends of said spring being contained in countersunk openings in the jaws. The rear portion of each jaw is tapered at $j\ j$, and corresponds with the tapered seat $k\ k$, of a sleeve, D, the latter having a threaded portion adapted to the threaded portion $b$ of the holder or shell A. A projecting portion, $l$, of the sleeve D prevents the access of foreign matters to the screw and inner portions of the chuck, acting in effect as a dust-shield.

The periphery of the sleeve D may be milled, as shown; or it may be many-sided, to facilitate its manipulation.

It will be seen by referring to Fig. 2 that the jaws B B, owing to the two inclined surfaces $f$ and $k$, are perfectly parallel when gripping a tool, and, in fact, at all times, as will be seen on reference to Fig. 3, which illustrates the jaws of the chuck open to their fullest extent, the spring $i$ keeping the tapered surfaces $e$ and $j$ of the jaws against the surfaces $f$ and $k$ of the shell and sleeve, so that, irrespective of the size of the shank of a tool placed in the chuck, the jaws will always have a parallel grip on said shank, thereby insuring a firm and powerful hold of the same.

My improved chuck has but few parts, which are in the main plain castings, so that a very cheap and substantial tool can be made in accordance with my invention.

I claim as my invention—

1. The combination, in a chuck, of the hollow shell or casing having internal tapered portions, $f$, at its outer end, with jaws B, having front tapered portions bearing against the front tapered portion of the shell, a screw-sleeve adapted to a thread on the shell, and having tapered portions $k$ bearing against the rear tapered portion of the jaws B, and a spring tending to open said jaws, all substantially as specified.

2. The combination, in a chuck, of the hollow shell or casing having front tapered portion $f$, with jaws B, having front inclines resting against the tapered portion $f$ of the shell, and a tapered sleeve, D, bearing against the tapered rear of the jaws, and having an annular projecting portion, $l$, extending in advance of the tapered portion and acting as a dust-shield for the chuck, substantially as and for the purpose set forth.

3. The combination, in a chuck, of the shell or casing having an internal tapered portion and external thread, a screw-sleeve adapted to said thread, and having an internal tapered portion, and two gripping-jaws having tapered portions adapted to those of the shell and sleeve, and a guiding-pin and spreading-spring, as and for the purpose set forth.

In testimony whereof I have signed my name to this specification in the presence of two subscribing witnesses.

GRIFFITH L. JONES.

Witnesses:
W. S. SHENTON,
F. PIERCE HUMMEL.